(12) United States Patent
Mackay et al.

(10) Patent No.: US 6,941,619 B2
(45) Date of Patent: Sep. 13, 2005

(54) EYEGLASS RETAINER WITH DUAL USE CONNECTORS

(75) Inventors: Brandon R. Mackay, Salt Lake City, UT (US); Bryan K. Hicks, Salt Lake City, UT (US)

(73) Assignee: Snugz/USA Incorporated, Salt Lake City, UT (US)

( * ) Notice: Subject to any disclaimer, the term of this patent is extended or adjusted under 35 U.S.C. 154(b) by 0 days.

(21) Appl. No.: 09/998,145

(22) Filed: Nov. 30, 2001

(65) Prior Publication Data

US 2003/0101542 A1 Jun. 5, 2003

(51) Int. Cl.$^7$ .............................................. G02C 11/00
(52) U.S. Cl. ............................ 24/3.3; 24/302; 351/157
(58) Field of Search .......................... 24/3.3, 3.13, 301, 24/302, 3.14; 351/155–157, 123

(56) References Cited

U.S. PATENT DOCUMENTS

| | | |
|---|---|---|
| 1,819,738 A | 8/1931 | Daniels |
| 2,481,946 A | 9/1949 | Pendleton ...................... 88/51 |
| 2,539,922 A | 1/1951 | Nyberg .......................... 88/51 |
| 2,660,092 A | 11/1953 | Bloom .......................... 88/51 |
| 2,704,961 A | 3/1955 | Weil ............................. 88/51 |
| 3,397,026 A | 8/1968 | Spina ......................... 351/157 |
| 3,450,467 A | 6/1969 | Philips ....................... 351/157 |
| 3,502,396 A | 3/1970 | Greenberg .................. 351/157 |
| 3,874,776 A | 4/1975 | Seron ......................... 351/123 |
| 3,879,804 A | 4/1975 | Lawrence .................... 24/3 C |
| 3,979,795 A * | 9/1976 | Seron ............................ 24/3.3 |
| 4,133,604 A | 1/1979 | Fuller ......................... 351/123 |
| 4,136,934 A * | 1/1979 | Seron ......................... 351/157 |
| 4,541,696 A | 9/1985 | Winger et al. .............. 351/123 |
| 4,790,646 A * | 12/1988 | Seron ......................... 351/156 |
| D309,619 S | 7/1990 | Kalbach ................... D16/129 |
| D328,908 S | 8/1992 | Kalbach ................... D16/123 |
| 5,191,363 A | 3/1993 | Smith et al. .................. 351/62 |
| 5,367,347 A | 11/1994 | Wilson et al. .............. 351/156 |
| 5,655,264 A | 8/1997 | Davancens et al. ........... 24/3.3 |
| 5,940,938 A | 8/1999 | Davancens et al. ........... 24/3.3 |
| 6,182,334 B1 | 2/2001 | Davancens .................... 24/3.3 |
| 6,233,345 B1 * | 5/2001 | Urwyler ..................... 381/381 |

FOREIGN PATENT DOCUMENTS

| | | | |
|---|---|---|---|
| EP | 0 058 772 B1 | 2/1985 | ............ G02C/3/02 |
| FR | 2746933 A1 * | 10/1997 | .......... G02C/11/00 |
| IT | 502283 | 11/1954 | |

OTHER PUBLICATIONS

Snugz USA Product Catalog, Jan. 1997, (10 pgs.).
Snugz USA Product Catalog, Jan. 1999, (8 pgs.).
Snugz USA Product Catalog, Jan. 2000, (10 pgs.).
Snugz USA Product Catalog, Jan. 2002, (9 pgs.).
Fields 2000 Collection Eyewear and Outdoor Accessories & Gifts, available on information and belief, Jan., 2000, (9 pgs.).

(Continued)

*Primary Examiner*—James R. Brittain
(74) *Attorney, Agent, or Firm*—Workman Nydegger (57) ABSTRACT

An eyeglass retainer is configured to retain an eyeglass in a desired position on the body of a user, such as the head or neck of the user. The retainer includes (i) a cord having a first end and a second end; (ii) a first connector coupled to the first end of the cord; and (iii) a second connector coupled to the second end of the cord. Each of the first and second connectors have: (i) a tubular wall defining a hollow chamber configured to receive an eyeglass earpiece therein; and (ii) an expandable opening extending through the tubular wall. The expandable opening may comprise: (i) a hole extending through the tubular wall; and (ii) a slit extending through the tubular wall. An eyeglass earpiece can be selectively mounted in each connector or a temple of the eyeglass can be mounted in each connector. Thus, the eyeglass retainer etains the eyeglass in one of a plurality of possible orientations on the body of the user.

23 Claims, 4 Drawing Sheets

OTHER PUBLICATIONS

Snugz USA, Inc. Website, Dated Oct. 3, 2000, (7 pgs.).
EK Ekccessories, Inc. Website, Dated Apr. 4, 2000, (5 pgs.).
Snugz USA Ad from "American Bicyclist and Motorcyclist" Mar. 1998, (1 pg.).

Pictures of Eyeglass Retainer, which, on information and belief, was available at least as early as Jan., 2001, (1 pg.).

* cited by examiner

EYEGLASS RETAINER WITH DUAL USE CONNECTORS

BACKGROUND OF THE INVENTION

1. The Background of the Invention

This invention is in the field of eyeglass retainers.

2. The Relevant Technology

Eyeglass retainers are employed by eyeglass wearers to maintain their eyeglasses in a desired position on their body. The retainers can be used to maintain an eyeglass adjacent the eyes of a user during exercise, recreation, employment, or during a variety of activities that require the user's glasses to be snugly affixed to the user's head.

By connecting the first and second opposing temples or earpieces of an eyeglass onto respective opposing first and second connectors of an eyeglass retainer, and cinching a slide of the retainer against the user's head, the retainer maintains the eyeglass on the user's face in a desired position.

Eyeglass retainers may also be employed to maintain a user's eyeglass suspended from the user's neck in the event the user does not want to wear the eyeglass, but wants to have the eyeglass conveniently ready for immediate use.

Some eyeglass retainers grip the earpiece of an eyeglass, while other retainers grip the temple of the eyeglass. Each orientation has its own distinct advantages.

Typical eyeglass retainers, however, are limited to a certain orientation in which they can grip a particular eyeglass. What is therefore needed is an eyeglass retainer that is not limited to a certain orientation that may be employed to grip an eyeglass.

BRIEF SUMMARY OF THE INVENTION

It is therefore an object of the invention to provide an improved eyeglass retainer.

It is another object of the invention to provide an eyeglass retainer that may be used to maintain an eyeglass on the body of a user in a variety of different positions.

It is another object of the invention to provide an eyeglass retainer having multiple uses.

It is another object of the invention to provide an eyeglass retainer configured to connect to either the temple or the earpiece of an eyeglass.

It is another object of the invention to provide an eyeglass retainer configured to be coupled to temples and/or earpieces having varying thicknesses.

An eyeglass retainer of the present invention is configured to retain an eyeglass in a desired position on the body of a user, such as the head or neck of the user. The retainer includes: (i) a cord having a first end and a second end; (ii) a first connector coupled to the first end of the cord; and (iii) a second connector coupled to the second end of the cord. The first and second connectors each have: (i) a tubular wall defining a hollow chamber configured to receive an eyeglass earpiece therein; and (ii) an expandable opening extending through the tubular wall. The expandable opening may comprise: (i) a hole extending through the tubular wall; and (ii) a slit extending through the tubular wall in communication with the hole.

The expandable opening is configured such that an eyeglass earpiece can be selectively moved through the opening such that the temple of the eyeglass is then mounted within the hollow chamber defined by a tubular wall of the connector. The earpiece can also be moved back through the opening and into the hollow chamber.

Thus, the retainer can grip either the earpieces or the temples of a particular eyeglass, as selected by a user. The versatile and multi-use eyeglass retainer thereby retains the eyeglass in one of a plurality of possible orientations on the body of the user.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
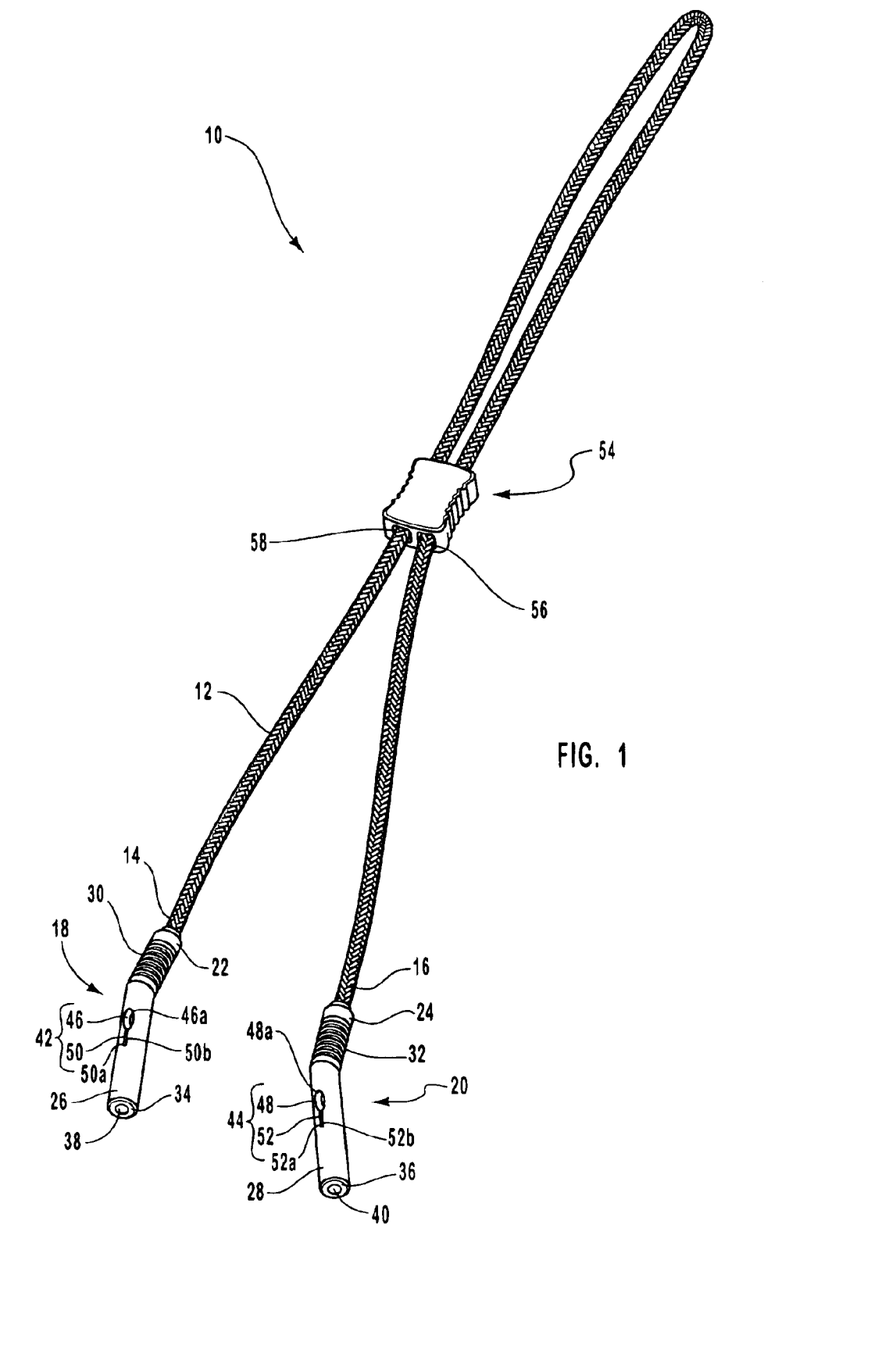
FIG. 1 is a perspective view of an eyeglass retainer of the present invention.

An eyeglass retainer 10 of the present invention is shown in FIG. 1. Retainer 10 is configured to retain an eyeglass in a desired position on the body of a user. Eyeglass retainer 10 can retain an eyeglass on the head of a wearer or suspend an eyeglass from the neck of a wearer, for example, in a variety of different manners. Retainer 10 can also be held in the hand of a user or placed on a hook or other structure to store an eyeglass. A variety of other uses are also possible.

Eyeglass retainer 10 includes (i) a cord 12 having a first end 14 and a second end 16; (ii) a first connector 18 coupled to first end 14 of cord 12; and (iii) a second connector 20 coupled to second end 16 of cord 12. Connectors 18, 20 selectively couple to different portions of an eyeglass, as will be discussed in additional detail below.

Each of the first and second connectors 18, 20 comprise a cord receiving end 22, 24 and an eyeglass receiving end 26, 28. Each end is configured to receive either a respective end of the cord or a respective portion of an eyeglass frame.

Each cord receiving end 22, 24 is configured to receive a respective end of cord 12 therein. In one embodiment, each such end 26, 28 comprises a hollow chamber configured to receive a cord end therein. In one such embodiment, an adhesive is applied to the ends 14, 16 of cord 12 (or to ends 22, 24 of connectors), after which the ends 14, 16 are mounted within respective ends 22, 24 of connectors 18, 20, thereby coupling cord 12 to connectors 18, 20. However, a variety of different methods may be employed for coupling a cord to connectors, such as by configuring the connectors to extend integrally from the cord. Each eyeglass receiving end may also include an accordian shaped exterior portion 30, 32 that may enable that portion to bend more readily.

Each eyeglass receiving portion 26, 28 of each connector 18, 20 is connected to a respective cord receiving portion 22, 24. In one embodiment, an inner partition separates each hollow cord receiving end 22, 24 from each respective hollow eyeglass receiving end 26, 28.

With continued reference to FIG. 1, each eyeglass receiving portion 26, 28 comprises (i) a tubular wall 34, 36 defining a hollow chamber 38, 40 configured to receive an eyeglass earpiece therein; and (ii) an expandable opening 42, 44 extending through the respective tubular wall 34, 36. Each expandable opening 42, 44 may comprise: (i) a hole 46, 48 extending through the respective tubular wall 34, 36; and (ii) a slit 50, 52 extending through each tubular wall 34, 36.

Each expandible opening 42, 44 is configured such that an eyeglass earpiece can be selectively moved through the respective opening 42, 44. Once the earpiece is moved through the opening, the temple of the eyeglass is then positioned within the hollow chamber 38, 40 of the respective connector 18, 20. Consequently, retainer 10 is configured such that retainer connectors 18, 20 selectively grip at least one of: (i) first and second earpieces of an eyeglass; and (ii) first and second temples of an eyeglass. The eyeglass retainer thereby retains the eyeglass in one of a plurality of possible orientations on the body of the user.

Each hole 46, 48 is defined by a substantially circular wall 46a, 48a. Each slit is also defined by respective adjacent walls 50a, 50b or 52a, 52b (see also FIG. 3B). The wall 46a, 48a of each hole 46, 48 is contiguous with the adjacent walls 50a, 50b or 52a, 52b of each respective slit. Thus, each hole and slit combination forms an opening comprising (i) a hole; and (ii) a slit that communicates with the hole. In other words, each opening 42, 44 is defined by the wall defining each hole and the walls defining each slit. Since each slit 50, 52 communicates with its respective hole 46, 48, each slit 50, 52 can expand as an earpiece extends through its adjacent hole 46, 48. Each slit 50, 52 can expand as an earpiece that is larger than its adjacent hole 46, 48 extends through the respective opening 42, 44.

When an earpiece that is smaller than a respective hole passes through the hole, the opening corresponding to that hole does not necessarily expand. However, when an earpiece larger than the hole passes through the opening, the slit generally expands. Thus, each opening 42, 44 is an expandable opening as a result of the unique and novel hole/slit combination featured herein.

Connectors 18, 20 each comprise a resilient, deformable material such that the earpiece, and/or temple can be pressed therein and such that the walls of each connector 18, 20 can expand and resiliently compress against the earpiece and/or temple placed therein, as shown in respective FIGS. 2A–3B. As the tubular walls of connectors 18, 20 compress against a respective earpiece and/or temple, connectors 18, 20 thereby grip the earpiece and/or temple.

Connectors 18, 20 each preferably comprise an elastomeric material, such as thermoplastic elastomer, or a similar material, although a variety of different materials can be employed for connectors 18, 20.

Figure 2A:
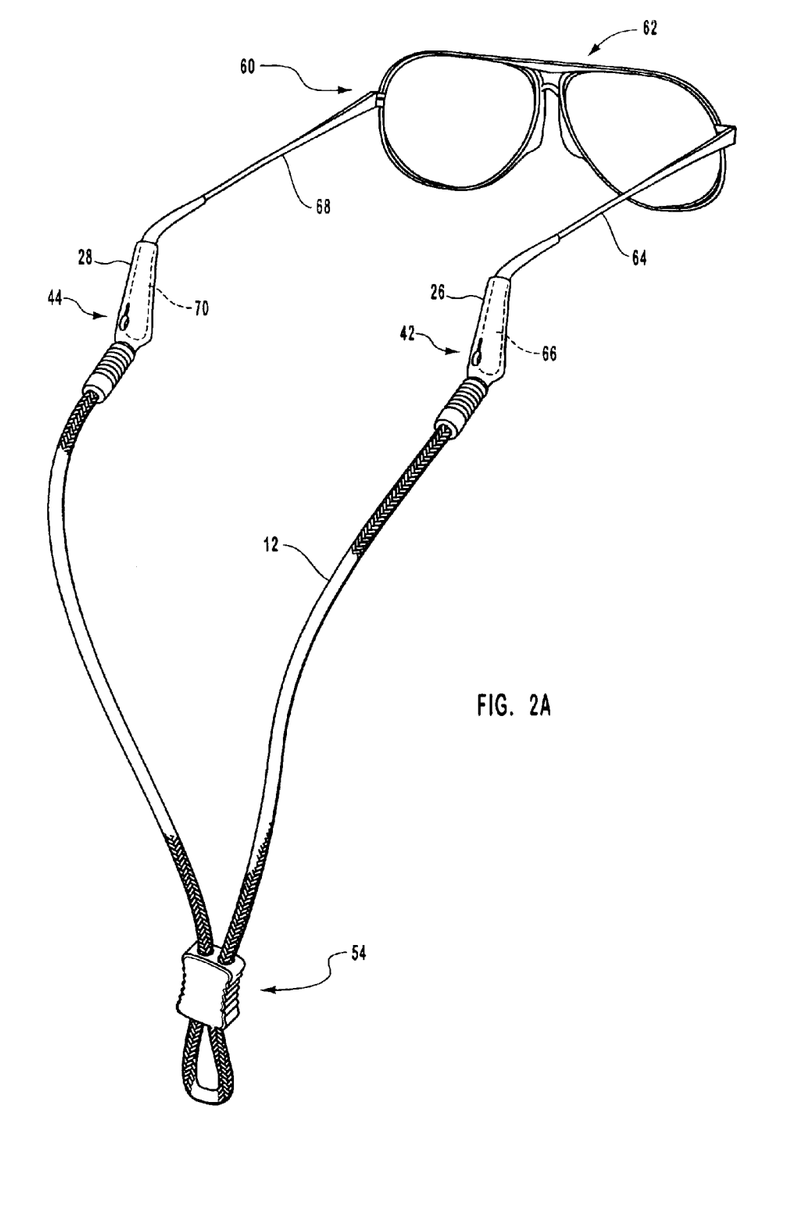
FIG. 2A is a view of an eyeglass retainer as shown in FIG. 1 with the earpieces of an eyeglass inserted within opposing connectors of the eyeglass retainer. The earpieces are shown in phantom lines within their respective connectors.

An example of retainer 10 being coupled in a first possible position to an eyeglass 60 is shown in FIG. 2A. Eyeglass 60 comprises a frame 62 comprising a first temple 64, a first earpiece 66 (shown in phantom lines in FIG. 2A) coupled to first temple 64, a second temple 68, and a second earpiece 70 (also as shown in phantom lines in FIG. 2A) coupled to the temple 68. FIG. 2A demonstrates an example of a use of retainer 10 in which earpieces 66, 70 are mounted within respective eyeglass receiving ends 26, 28. In FIG. 2A, earpieces 66, 70 are not extended through expandable openings 42, 44.

Figure 2B:
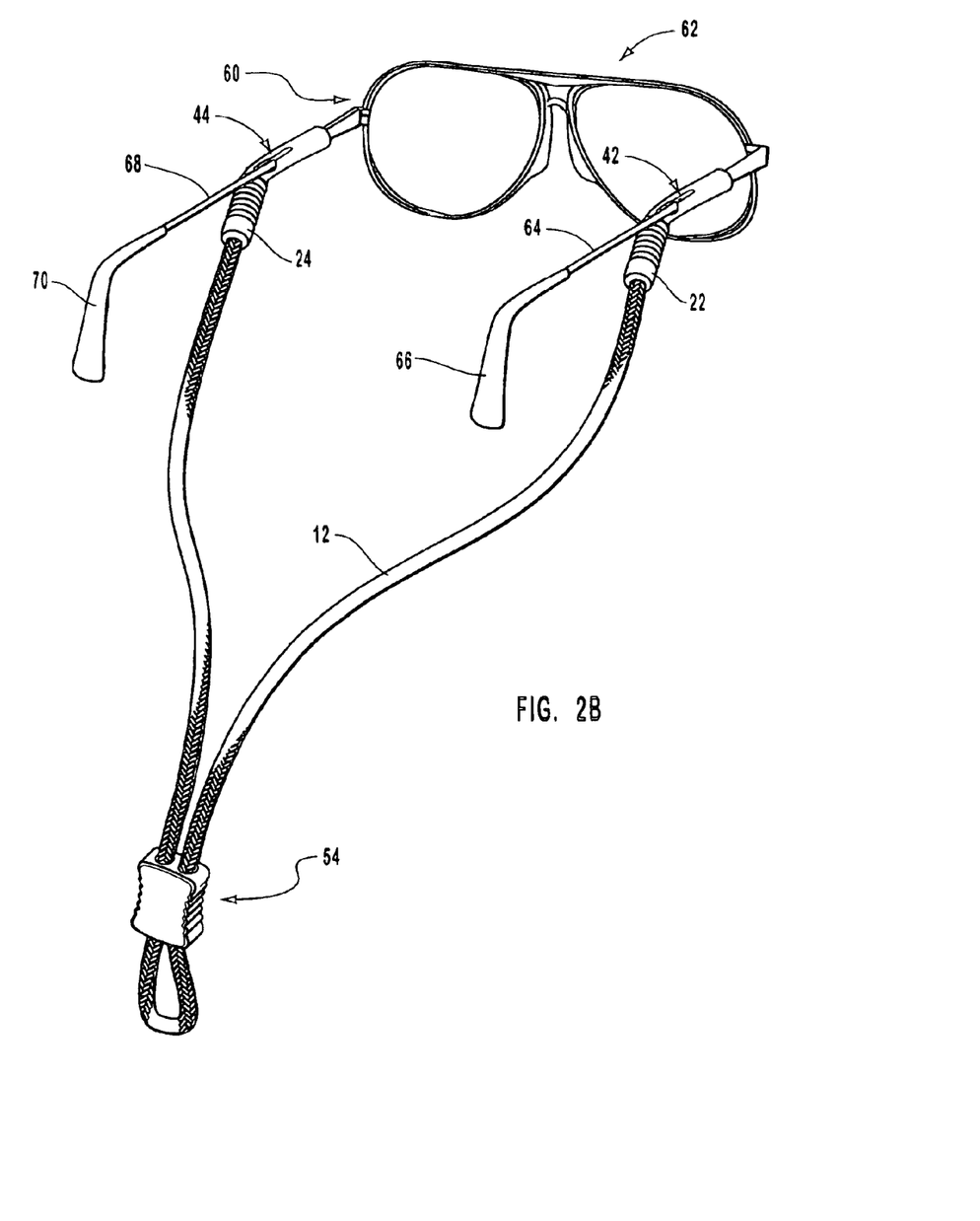
FIG. 2B is a view of an eyeglass retainer as shown in FIG. 1 with the temples of an eyeglass extended through opposing connectors of the eyeglass retainer, such that the connectors couple to the temples of the eyeglass.

In the embodiment of FIG. 2B, however, a second possible position is shown. Earpieces 66, 70 are shown as having been extended through respective openings 42, 44 such that respective connectors 18, 20 grip temples 64, 68. Thus, as shown in FIG. 2B, the connectors 18, 20 of retainer 10 may be mounted on temples 64, 68 to thereby grip temples 64, 68, or, as shown in FIG. 2A, connectors 18, 20 may be mounted on respective earpieces 66, 70 to thereby grip respective earpieces 66, 70.

Also as shown, connectors 18, 20 are angled such that, as shown in FIG. 2B, as retainer 10 grips temples 64, 68, the cord receiving ends 22, 24 of connectors 18, 20 dip conveniently below temples 64, 68.

Figure 3A:
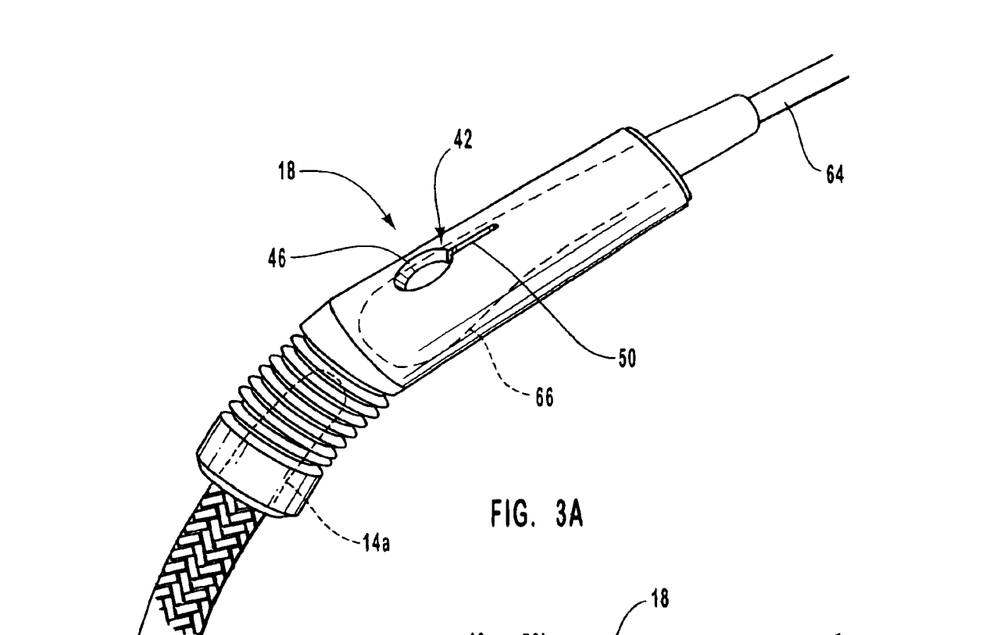
FIG. 3A is a cutaway view of an eyeglass retainer connector as shown in FIG. 1 with an eyeglass earpiece mounted therein, as shown in phantom lines. A distal tip 14a of the cord is mounted within a cord receiving chamber of the connector.
Figure 3B:
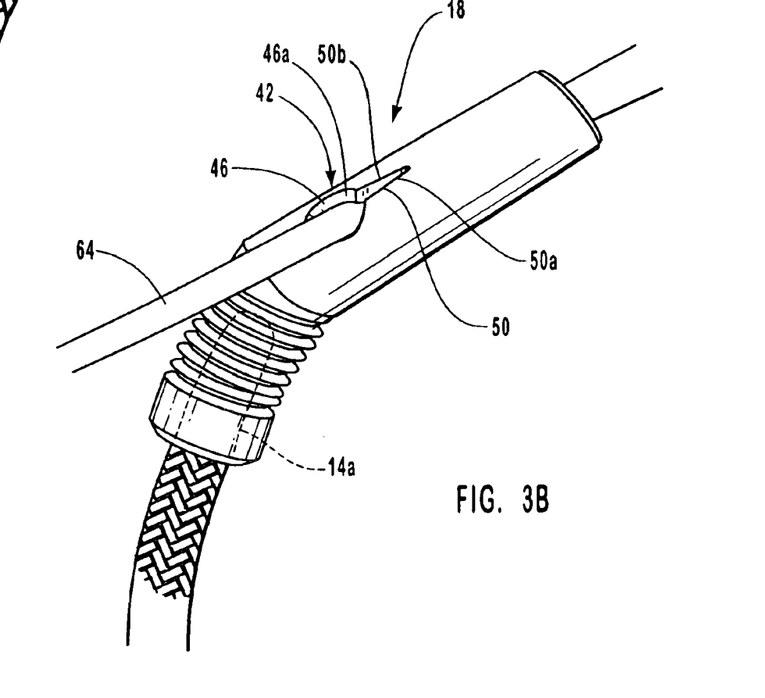
FIG. 3B is a cutaway view of an eyeglass retainer connector as shown in FIG. 1 with a eyeglass temple mounted therein, illustrating the gripping action of the connector onto the temple when the earpiece is extended past the opening. The opening is shown in an expanded orientation, as opposed to FIG. 3A.

The difference between the mounting of FIGS. 2A and 2B is further illustrated in FIGS. 3A and 3B. FIGS. 3A–3B only feature one connector 18, although second connector 20 may be configured the same or similar thereto. As shown in FIG. 3A, earpiece 66 (shown in phantom lines) is mounted within connector 18. As shown in FIG. 3B, however, earpiece 66 has been extended through opening mounted within connector 18.

Once the earpiece and/or temple is extended through opening 42, opening 42 can expand, as shown in FIG. 3B. As depicted in FIG. 3B, each slit 50 intersects its respective hole 46 such that slit 50 and hole 46 can form an effectively larger opening than that formed merely by hole 46. However, since slit 50 is in the form of a slit, opening 42 can be small when smaller temples 66 are extended therethrough (and can thereby snugly grip the temple) or can be expanded when larger temples 66 are extended therethrough, and can thereby accommodate and grip the larger temples. In addition to being expandible, openings 42, 44 are also preferably resilient, to thereby grip a variety of different temples that are extended therethrough. Thus, expandible openings 42, 44 accomodate a variety of different sized and shaped earpieces and/or temples.

Each connector 18, 20 may be injection or insertion molded or may be made through a variety of different methods. Each connector may thus comprise an injection molded member having a first hollow chamber (which receives an end of the cord therein—see tip 14a of end 14 cord 12 in FIG. 3A) and a second hollow chamber (which receives an earpiece of an eyeglass therein).

The term "eyeglass" as used in this specification and the appended claims may include any object that can be worn or placed adjacent the eyes of a user, such as objects commonly known as an eyeglass, eyeglasses, glasses, eyewear, goggles, sunglasses, eye protectors, safety glasses, shades, or a variety of other such commonly used objects.

The term "earpiece" as used in this specification and the appended claims may include, for example, any portion of an eyeglass that can fit on or adjacent the ear of a user, that can stabilize an eyeglass on the head of a user, or that otherwise extends from a temple of an eyeglass. The earpiece is not required to be bent with respect to the temple. The term "temple" as used in this specification and the appended claims may include the portion of an eyeglass frame that is adjacent to and extends rearwardly from the lens holding portion of the frame, that is adjacent to the temple of a user when the eyeglass is in use, or that is positioned between an earpiece of the eyeglass and the lens holding portion of the eyeglass. The temple often (but not necessarily) has a hinge thereon such that the eyeglass can be conveniently folded. In yet another embodiment, the earpiece comprises the proximal end of an eyeglass frame support that extends proximally with respect to one or more lenses while the temple comprises the distal end of an eyeglass frame support that extends proximally with respect to one or more lenses.

Retainer 10 further comprises a slider 54 (FIG. 1) configured to selectively cinch retainer 10 snugly against the head of a user. Slider 54 has first and second tubular chambers 56, 58 through which respective cord portions pass. Slider 54 slides over opposing portions of cord 12, then cinches adjacent the head of a user, thereby causing retainer 10 to tighten on the user's head.

Slider 54 may have a variety of different configurations that enable it to cinch retainer 10 tightly against the head of a user. In one embodiment, however, no slider is employed. In such an embodiment, retainer 10 can be used to suspend an eyeglass on the neck of a user when the eyeglass is not in use and/or can be worn about the neck while the eyeglass is in use as fail safe to prevent the eyeglass from contacting the ground if it falls from the user's face. In one embodiment, slider 54 is mounted on cord 12 (or cord ends 14, 16 are extended through slider 54), after which connectors 18, 20 are coupled to cord ends 14, 16.

Cord 12 may comprise a variety of different elongate members that extend between first and second connectors. For example, cord 12 may comprise a flexible braided line, a wire, a chain, a rope, a string, an elongate elastomeric member, a leather or cloth member, a strand, or a variety of other elongate members comprised of a variety of different materials that can serve as a retainer cord. A variety of additional examples of materials that can be employed for a cord 12 of the present invention.

In the embodiment of eyeglass retainer 10 shown in FIGS. 1–3B, each connector 18, 20 is non-integrally connected to its corresponding cord end 14, 16, such as through the use of an adhesive. Tip 14A of end 14 of cord 12 is shown in phantom lines mounted in cord receiving end 22 in FIGS. 3A and 3B. However, in another embodiment, the cord is integrally coupled to one or more connectors.

Connector 18 is an example of first means for selectively coupling to one of: (i) the temple; and (ii) the earpiece of an eyeglass. Connector 20 is an example of second means for selectively coupling to one of (i) the temple; and (ii) the earpiece of an eyeglass. A variety of other examples may be employed, however, as will be appreciated by one skilled in the art in light of the disclosure herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An eyeglass retainer configured to retain an eyeglass in a desired position on the body of a user, the eyeglass retainer comprising:
    a cord having a first end and a second end;
    first means coupled to the first end of the cord for selectively coupling to one of (i) a first temple of an eyeglass; and (ii) a first earpiece coupled to the first temple of the eyeglass; and
    second means coupled to the second end of the cord for selectively coupling to one of (i) a second temple of an eyeglass; and (ii) a second earpiece coupled to the second temple of the eyeglass, wherein each of the first and second means for selectively coupling comprises a hollow member configured to receive an eyeglass earpiece therein, wherein an opening extends through the hollow member, the opening comprising:
        (A) a hole extending through the hollow member; and
        (B) a slit extending through the hollow member, the slit being oriented adjacent the hole.

2. An eyeglass retainer as recited in claim 1, wherein the first means for selectively coupling, and the second means for selectively coupling comprise a first and second connector, respectively.

3. An eyeglass retainer as recited in claim 2, wherein each of the openings is an expandable opening.

4. An eyeglass retainer as recited in claim 1, wherein adhesive connects the first and second ends of the cord to respective first and second connectors.

5. An eyeglass retainer as recited in claim 1, wherein the eyeglass retainer retains an eyeglass on the head of a wearer.

6. An eyeglass retainer as recited in claim 1, wherein the eyeglass retainer suspends an eyeglass from the neck of a wearer.

7. An eyeglass retainer as recited in claim 1, wherein each means for coupling is non-integrally connected to its corresponding end of the cord.

8. An eyeglass retainer configured to retain an eyeglass in a desired position on the body of a user, the eyeglass retainer comprising:
    a cord having a first end and a second end;
    a first connector coupled to the first end of the cord; and
    a second connector coupled to the second end of the cord, wherein each of the first and second connectors is configured to selectively couple to one of (i) a temple of an eyeglass; and (ii) an earpiece of said eyeglass, wherein the first connector comprises a hollow member configured to receive an eyeglass earpiece therein, wherein an opening extends through a wall of the hollow member, the hollow member being configured such that the earpiece can be selectively moved from within the hollow member through the opening such that the temple of the eyeglass is mounted within the opening, wherein the hollow member grips the earpiece when the earpiece is mounted within the hollow member and grips the temple when the temple is mounted within the opening, wherein the opening has a plurality of different portions, wherein the plurality of different portions include a hole and a slit adjacent to the hole.

9. An eyeglass retainer configured to retain an eyeglass in a desired position on the body of a user, the eyeglass retainer comprising:
    a cord having a first end and a second end;
    a first connector coupled to the first end of the cord; and
    a second connector coupled to the second end of the cord, wherein the first connector has:

(i) a hollow chamber configured to receive an eyeglass earpiece therein; and (ii) an opening communicating with the hollow chamber, the opening configured such that the eyeglass earpiece can be selectively moved from the chamber through the opening such that a temple of the eyeglass is mounted within the opening, wherein the opening has a hole having a slit adjacent thereto.

10. An eyeglass retainer as recited in claim 9, wherein the second connector has:

(i) a hollow chamber configured to receive an eyeglass earpiece therein; and (ii) an opening communicating with the hollow chamber, the opening configured such that the eyeglass earpiece can be selectively moved from the chamber through the opening such that a temple of the eyeglass is mounted within the opening, wherein the opening comprises a hole having a slit adjacent thereto.

11. An eyeglass retainer as recited in claim 9, wherein the slit communicates with the hole, such that the slit expands as an earpiece extends through the hole.

12. An eyeglass retainer as recited in claim 9, wherein the eyeglass retainer is configured such that the retainer connectors selectively grip at least one of: (i) first and second earpieces of an eyeglass; and (ii) first and second temples of an eyeglass.

13. An eyeglass retainer configured to retain an eyeglass in a desired position on the body of a user, the eyeglass having an eyeglass frame comprising a first temple, a first earpiece coupled to the first temple, a second temple, and a second earpiece coupled to the temple, the eyeglass retainer comprising:

a cord having a first end and a second end;
a first connector coupled to the first end of the cord; and
a second connector coupled to the second end of the cord, wherein each of the first and second connectors has:

(i) a tubular wall defining a hollow chamber configured to receive an eyeglass earpiece therein; and (ii) an opening extending through the tubular wall, the opening comprising:

(A) a hole extending through the tubular wall; and (B) a slit extending through the tubular wall, the slit being oriented adjacent the hole.

14. An eyeglass retainer as recited in claim 13, wherein the slit and the hole are in communication with each other.

15. An eyeglass retainer as recited in claim 13, wherein the slit expands as an earpiece that is larger than the hole extends through the opening.

16. An eyeglass retainer configured to retain an eyeglass in a desired position on the body of a user, the eyeglass having an eyeglass frame comprising a first temple, a first earpiece coupled to the first temple, a second temple, and a second earpiece coupled to the temple, the eyeglass retainer comprising:

a cord having a first end and a second end;
a first connector coupled to the first end of the cord; and
a second connector coupled to the second end of the cord, wherein each of the first and second connectors has:

(i) a tubular wall defining a hollow chamber configured to receive an eyeglass earpiece therein;

(ii) a hole extending through the tubular wall; and (iii) a slit extending through the tubular wall.

17. A retainer as recited in claim 16, wherein the slit communicates with the hole such that the slit expands as an earpiece that is larger than the hole that extends through the opening.

18. An eyeglass retainer as recited in claim 16, wherein the slit and the hole are in communication with each other.

19. An eyeglass retainer as recited in claim 16, wherein the slit expands as an earpiece that is larger than the hole extends through the opening.

20. An eyeglass retainer configured to retain an eyeglass in a desired position on the body of a user, the eyeglass retainer comprising:

a cord having a first end and a second end;
a first connector coupled to the first end of the cord; and
a second connector coupled to the second end of the cord, wherein the first connector is configured: (i) to selectively receive and retain a temple of an eyeglass; and (ii) to selectively receive and retain an earpiece of said eyeglass, wherein the first connector has (A) a hollow member configured to receive an eyeglass earpiece therein; and (B) an opening communicating with a chamber of the hollow member such that the eyeglass earpiece can be selectively moved from the chamber of the hollow member through the opening such that a temple of the eyeglass is mounted within the opening, the first connector gripping the earpiece when the earpiece is mounted in the chamber and the first connector gripping the temple when the temple is mounted within the opening, wherein the opening has a plurality of distinct portions that are adjacent to each other, each of the distinct portions having a different configuration, wherein the portions of the opening include: (i) a hole; and a (ii) a slit adjacent to the hole.

21. A retainer as recited in claim 20, wherein each of the first and second connectors has a hole therein and a slit therein adjacent to the hole.

22. A method for retaining an eyeglass in a desired position on the body of a user, the eyeglass having first and second temples and first and second earpieces coupled to respective temples, the method for retaining the eyeglass comprising:

providing an eyeglass retainer comprising:
a cord having a first end and a second end;
a first connector coupled to the first end of the cord; and
a second connector coupled to the second end of the cord, wherein each of the first and second connectors comprises a hollow member configured to selectively receive an earpiece of said eyeglass therein; and inserting first and second earpieces of an eyeglass into respective first and second connectors of the eyeglass retainer, wherein each of the first and second connectors has a hole therein and a slit therein in communication with the hole, wherein the hole and slit extend through a wall of the hollow member.

23. A method as recited in claim 22, further comprising selectively moving the first and second temples of the eyeglass through respective openings in the first and second connectors.

* * * * *

UNITED STATES PATENT AND TRADEMARK OFFICE
CERTIFICATE OF CORRECTION

PATENT NO. : 6,941,619 B2  Page 1 of 1
APPLICATION NO. : 09/998145
DATED : September 13, 2005
INVENTOR(S) : Mackay et al.

It is certified that error appears in the above-identified patent and that said Letters Patent is hereby corrected as shown below:

Cover Page
Item [57], ABSTRACT, line 15, change "etains" to --retains--

Column 3
Line 3, change "26, 28" to --22, 24--

Column 4
Line 36, after "opening" insert -- 42 such that temple 64 is--
Line 44, remove [66]
Line 46, remove [66]
Line 57, after "end 14" insert -- of--

Column 5
Line 44, remove [that]

Column 6
Line 22, change "coupling," to --coupling--

Column 8
Line 35, before "(ii)" remove [a]

Signed and Sealed this

Fourteenth Day of November, 2006

JON W. DUDAS
*Director of the United States Patent and Trademark Office*